(12) United States Patent
Han et al.

(10) Patent No.: US 12,191,484 B2
(45) Date of Patent: Jan. 7, 2025

(54) POSITIVE ELECTRODE MATERIAL FOR LITHIUM SECONDARY BATTERY, AND POSITIVE ELECTRODE AND LITHIUM SECONDARY BATTERY INCLUDING SAME

(71) Applicant: LG Chem, Ltd., Seoul (KR)

(72) Inventors: Jung Min Han, Daejeon (KR); Dong Hun Lee, Daejeon (KR); Sung Bin Park, Daejeon (KR); Hyung Man Cho, Daejeon (KR); Jin Tae Hwang, Daejeon (KR); Wang Mo Jung, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 717 days.

(21) Appl. No.: 17/298,818

(22) PCT Filed: Dec. 4, 2019

(86) PCT No.: PCT/KR2019/017027
§ 371 (c)(1),
(2) Date: Jun. 1, 2021

(87) PCT Pub. No.: WO2020/122497
PCT Pub. Date: Jun. 18, 2020

(65) Prior Publication Data
US 2022/0059832 A1    Feb. 24, 2022

(30) Foreign Application Priority Data

Dec. 10, 2018 (KR) .................. 10-2018-0158017

(51) Int. Cl.
*H01M 4/525* (2010.01)
*H01M 4/36* (2006.01)
(Continued)

(52) U.S. Cl.
CPC .......... *H01M 4/525* (2013.01); *H01M 4/364* (2013.01); *H01M 4/505* (2013.01);
(Continued)

(58) Field of Classification Search
CPC ...... H01M 4/525; H01M 4/364; H01M 4/505; H01M 10/0525; H01M 2004/021;
(Continued)

(56) References Cited

U.S. PATENT DOCUMENTS

2008/0241647 A1* 10/2008 Fukui .................. H01M 4/386
                                                        29/623.5
2010/0099027 A1    4/2010  Kikuya et al.
(Continued)

FOREIGN PATENT DOCUMENTS

CN         101622741 A       1/2010
CN         104282903 A       1/2015
(Continued)

OTHER PUBLICATIONS

Search report from International Application No. PCT/KR2019/017027, mailed Mar. 24, 2020.
(Continued)

*Primary Examiner* — James M Erwin
*Assistant Examiner* — Kevin Nguyen
(74) *Attorney, Agent, or Firm* — Lerner David LLP (57) ABSTRACT

A positive electrode material and a positive electrode and a lithium secondary battery including the same are provided. The positive electrode material having a bimodal particle size distribution which includes large-diameter particles and small-diameter particles having different average particle diameters ($D_{50}$), wherein the large-diameter particles are lithium composite transition metal oxide having a nickel content of 80 atm % or more in all transition metals thereof, and the small-diameter particles are a lithium composite
(Continued)

transition metal oxide including nickel, cobalt, and aluminum, having a nickel content of 80 atm % to 85 atm % in all transition metals, and having an atomic ratio of the cobalt to the aluminum (Co/Al) of 1.5 to 5.

9 Claims, 3 Drawing Sheets

(51) Int. Cl.
  *H01M 4/505* (2010.01)
  *H01M 10/0525* (2010.01)
  *H01M 4/02* (2006.01)
(52) U.S. Cl.
  CPC .. *H01M 10/0525* (2013.01); *H01M 2004/021* (2013.01); *H01M 2004/028* (2013.01)
(58) Field of Classification Search
  CPC ........... H01M 2004/028; H01M 4/131; H01M 4/485; H01M 10/052; Y02E 60/10
  USPC ........................................................ 429/209
  See application file for complete search history.

(56) References Cited

U.S. PATENT DOCUMENTS

| | | |
|---|---|---|
| 2013/0302685 A1 | 11/2013 | Kim et al. |
| 2014/0038052 A1* | 2/2014 | Song ............... H01M 4/5815 429/223 |
| 2014/0363736 A1* | 12/2014 | Kim ................. H01M 4/133 429/223 |
| 2015/0010819 A1 | 1/2015 | Lee et al. |
| 2015/0093580 A1 | 4/2015 | Kobayashi et al. |
| 2015/0340686 A1 | 11/2015 | Sun et al. |
| 2016/0118656 A1 | 4/2016 | Nakayama et al. |
| 2017/0309898 A1 | 10/2017 | Hong |
| 2017/0324097 A1 | 11/2017 | Lee et al. |
| 2017/0346133 A1 | 11/2017 | Je et al. |
| 2018/0145322 A1 | 5/2018 | Choi et al. |
| 2018/0219212 A1 | 8/2018 | Seol et al. |
| 2018/0233766 A1 | 8/2018 | Lee et al. |
| 2018/0241036 A1 | 8/2018 | Jo et al. |
| 2018/0323423 A1 | 11/2018 | Kim et al. |
| 2018/0323428 A1 | 11/2018 | Nakayama et al. |

FOREIGN PATENT DOCUMENTS

| | | |
|---|---|---|
| CN | 105009333 A | 10/2015 |
| CN | 105144439 A | 12/2015 |
| CN | 107949938 A | 4/2018 |
| JP | 2013065468 A | 4/2013 |
| JP | 2017-204468 A | 11/2017 |
| KR | 20120126021 A | 11/2012 |
| KR | 20140098433 A | 8/2014 |
| KR | 20150006283 A | 1/2015 |
| KR | 20150080149 A | 7/2015 |
| KR | 20160075196 A | 6/2016 |
| KR | 20160100697 A | 8/2016 |
| KR | 20170063373 A | 6/2017 |
| KR | 20170069153 A | 6/2017 |
| KR | 20170135160 A | 12/2017 |
| KR | 20180056310 A | 5/2018 |
| KR | 20180093593 A | 8/2018 |
| KR | 20180122238 A | 11/2018 |
| WO | 2014061399 A1 | 4/2014 |

OTHER PUBLICATIONS

"A Basic Guide to Particle Characterization", Malvern Instruments Worldwide—White Paper, May 2, 2012, pp. 1-26, XP055089322, URL: http://golik.co.il/Data/ABasicGuidtoParticleCharacterization(2)_1962085150.pdf <https://protect-us.mimecast.com/s/L2ApCkROoKsnYnODS2aNzA?domain=golik.co.il>.

Extended European Search Report for corresponding European Patent Application No. EP19897077 dated Dec. 20, 2021, 3 pgs.

Wang, Z et al., "Hierarchical LiNi0.8Co0.15Al0.05O2 plates with exposed {010} active planes as a high performance cathode material for Li-ion batteries", "RSC Advances", Jan. 2016, vol. 6, No. 38, pp. 32365-32369.

\* cited by examiner

POSITIVE ELECTRODE MATERIAL FOR LITHIUM SECONDARY BATTERY, AND POSITIVE ELECTRODE AND LITHIUM SECONDARY BATTERY INCLUDING SAME

CROSS-REFERENCE TO RELATED APPLICATIONS

The present application is a national stage entry under 35 USC § 371 of International Application No. PCT/KR2019/017027 filed on Dec. 4, 2019, which claims priority from Korean Patent Application No. 10-2018-0158017, filed on Dec. 10, 2018, in the Korean Intellectual Property Office, the disclosures of which are incorporated herein in their entirety by reference.

TECHNICAL FIELD

The present invention relates to a positive electrode material for a lithium secondary battery and a positive electrode and a lithium secondary battery including the same.

BACKGROUND ART

As the technology development and demand for mobile devices have increased, the demand for secondary batteries as an energy source has been rapidly increased. Among such secondary batteries, lithium secondary batteries having a high energy density and voltage, a long cycle life, and a low self-discharging rate have been commercialized and widely used.

As a positive electrode active material of a lithium secondary battery, a lithium transition metal composite oxide is used. Among such lithium transition metal composite oxides, a lithium cobalt composite metal oxide which has a high functional voltage and excellent capacity properties such as $LiCoO_2$ has been mainly used. However, $LiCoO_2$ has very poor thermal properties due to the destabilization of crystal structure according to de-lithium, and is expensive. Therefore, $LiCoO_2$ has a limitation in being used as a power source for an electric vehicle or the like in a large amount.

As a material to replace $LiCoO_2$, a lithium manganese oxide ($LiMnO_2$, $LiMn_2O_4$, or the like), a lithium iron phosphate compound ($LiFePO_4$, and the like), or a lithium nickel oxide ($LiNiO_2$, and the like) has been developed. Among the above materials, research and development has been actively conducted on a lithium nickel oxide which has a high reversible capacity of about 200 mAh/g, thereby easily implementing a high capacity battery. However, when compared with $LiCoO_2$, the $LiNiO_2$ has a lower thermal stability, and has a problem in that when external pressure or the like causes an internal short circuit in a charged state, a positive electrode active material itself is decomposed, causing the rupture and ignition of a battery. Therefore, as a method for improving the thermal stability of $LiNiO_2$, which is low, while maintaining the excellent reversible capacity thereof, a lithium-nickel-cobalt-manganese oxide in which a part of Ni is substituted with Mn and Co has been developed.

However, the lithium nickel-cobalt-manganese oxide has low roll-pressing density of particles. Particularly, when the content of Ni is increased in order to increase capacity properties, the roll-pressing density of the particles is even lowered, thereby decreasing energy density. When an electrode is roll-pressed hard in order to increase the roll-pressing density, there have been problems in that a current collector breaks and a positive electrode material cracks.

Also, in the case of a lithium nickel-cobalt-manganese oxide having a high content of Ni, the structural stability is reduced at high temperatures, so that electrochemical performance such as high-temperature lifespan is deteriorated.

Therefore, there has been a demand for developing a positive active material which is excellent in energy density and capacity properties, and also in high-temperature lifespan properties.

PRIOR ART DOCUMENT

Patent Document

Korean Patent Laid-open Publication No. 10-2016-0075196

DISCLOSURE OF THE INVENTION

Technical Problem

An aspect of the present invention provides a positive electrode material and a positive electrode and a lithium secondary battery including the same, the positive electrode material having a high roll-pressing density, thereby having excellent energy density and capacity properties, and having excellent high-temperature lifespan properties and continuous charge properties.

Technical Solution

According to an aspect of the present invention, there are provided a positive electrode material and a positive electrode and a lithium secondary battery including the same, the positive electrode material having a bimodal particle size distribution which includes large-diameter particles and small-diameter particles having different average particle diameters ($D_{50}$), wherein the large-diameter particles are lithium composite transition metal oxide having a nickel content of 80 atm % or more in all transition metals thereof, and the small-diameter particles are a lithium composite transition metal oxide including nickel, cobalt, and aluminum, having a nickel content of 80 atm % to 85 atm % in all transition metals, and having an atomic ratio of the cobalt to the aluminum (Co/Al) of 1.5 to 5.

According to another aspect of the present invention, there is provided a positive electrode including a positive electrode current collector and a positive electrode active material layer formed on the positive electrode current collector, wherein the positive electrode active material layer includes the positive electrode material according to the present invention.

According to yet another aspect of the present invention, there is provided a lithium secondary battery including the positive electrode according to the present invention, a negative electrode, a separator interposed between the positive electrode and the negative electrode, and an electrolyte.

Advantageous Effects

A positive electrode material of the present invention includes large-diameter particles and small-diameter particles having different average particle diameters ($D_{50}$) so that the small-diameter particles fill in gaps between the large-diameter particles. Therefore, during electrode coating, the coating may be performed with a high roll-pressing density, so that excellent energy density may be implemented.

In addition, the positive electrode material of the present invention has excellent capacity properties as a high-nickel positive electrode material having a nickel content of 80 atm % or higher, and at the same time, uses small-diameter particles including nickel, cobalt, and aluminum at a specific ratio, thereby implementing excellent high-temperature lifespan properties and continuous charge performance when applied to a lithium secondary battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

BEST MODE FOR CARRYING OUT THE INVENTION

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present specification, an average particle diameter ($D_{50}$) may be defined as a particle diameter at 50% of a particle diameter distribution, and may be measured by a laser diffraction method. Specifically, target particles are dispersed in a dispersion medium, and then introduced into a commercially available laser diffraction particle size measurement device (for example, Microtrac MT 3000) to be irradiated with ultrasonic waves of about 28 kHz to an output of 60 W. Thereafter, the average particle diameter ($D_{50}$) may be measured at 50% in a cumulative particle volume distribution according to particle diameters in the measurement device.

In the present specification, the content of each element in a lithium composite transition metal oxide may be measured through inductive coupled plasma (ICP) analysis using an inductively-coupled plasma light-emission spectrometer (ICP-OES; Optima 7300DV, PerkinElmer Co., Ltd.).

In the present specification, % means wt % unless otherwise stated.

The present inventors have repeatedly conducted research on developing a positive electrode material excellent in capacity properties, energy density, and high-temperature lifespan properties. As a result, the present inventors have found that the above-described objective may be achieved by using a lithium composite transition metal oxide having a high nickel content as large-diameter particles and using a lithium composite transition metal oxide having a specific composition as small-diameter particles in a positive electrode material having a bimodal particle size distribution, and have completed the present invention.

Positive Electrode Material

First, a positive electrode material according to the present invention will be described.

A positive electrode material according to the present invention is a positive electrode material having a bimodal particle size distribution which includes large-diameter particles and small-diameter particles having different average particle diameters ($D_{50}$), wherein the large-diameter particles are lithium composite transition metal oxide having a nickel content of 80 atm % or more in all transit ion metals thereof, and the small-diameter particles are a lithium composite transition metal oxide including nickel, cobalt, and aluminum, having a nickel content of 80 atm % to 85 atm % in all transition metals, and having an atomic ratio of the cobalt to the aluminum (Co/Al) of 1.5 to 5.

As in the present invention, when large-diameter particles and small-diameter particles having different average particle diameter ($D_{50}$) are mixed and used, gaps between the large-diameter particles are filled with the small-diameter particles. Therefore, when compared with a case in which particles having one average particle diameter are used, electrode coating may be performed with a relatively higher roll-pressing density, so that the energy density of an electrode may be increased.

Meanwhile, in the present invention, as small-diameter particles, a lithium composite transition metal oxide having a nickel content of 80 atm % to 85 atm % and having an aluminum and cobalt which meet a specific composition ratio is used. Specifically, the small-diameter particles include nickel, cobalt, and aluminum, have a nickel content of 80 atm % to 85 atm % in all transition metals, and have an atomic ratio of the cobalt to the aluminum (Co/Al) of 1.5 to 5, preferably 1.7 to 5, more preferably 1.7 to 3.

According to the research by the present inventors, when a lithium composite transition metal oxide meeting the above composition is used as small-diameter particles, it is possible to implement the improvement of high-capacity properties, high-temperature stability, and continuous charge properties, simultaneously.

Specifically, when the nickel content of small-diameter particles is less than 80 atm %, the capacity properties are deteriorated, and when greater than 85 atm %, the high-temperature stability and continuous charge properties are deteriorated. In addition, even when the nickel content of the small-diameter particles meet 80 atm % to 85 atm %, when the atomic ratio of cobalt to aluminum (Co/Al) is less than 1.5 or greater than 5, high-temperature lifespan properties and continuous charge properties are deteriorated. That is, when small-diameter particles meeting the specific composition of the present invention are used, capacity properties, high-temperature stability, and continuous charge properties are all excellent.

In the present invention, the small-diameter particles may be a lithium composite transition metal oxide represented by [Formula 1] below.

$$Li_x[Ni_yCo_zAl_wM^1_v]O_2 \qquad \text{[Formula 1]}$$

In Formula 1 above, $M^1$ is one or more selected from the group consisting of Mn, W, Cu, Fe, Ba, V, Cr, Ti, Zr, Zn, In, Ta, Y, La, Sr, Ga, Sc, Gd, Sm, Ca, Ce, Nb, Mg, B, and Mo, preferably Mn, and 0.9≤x≤1.5, 0.8≤y≤0.85, 0<z≤0.1, 0<w≤0.1, 1.5≤z/w≤5, and 0≤v<0.2.

At this time, the x represents the atomic ratio of lithium in the lithium complex transition metal oxide, wherein 0.9≤x≤1.5, preferably 0.9≤x≤1.2, and more preferably 0.9≤x≤1.1.

The y represents the atomic ratio of nickel in all transition metals of the lithium composite transition metal oxide, wherein 0.8≤y≤0.85, preferably 0.8≤y≤0.84.

The z represents the atomic ratio of cobalt in all transition metals of the lithium composite transition metal oxide, wherein 0<z≤0.1, preferably 0.01≤z≤0.1.

The w represents the atomic ratio of aluminum in all transition metals of the lithium composite transition metal oxide, wherein 0<w≤0.1, preferably 0.01 w≤0.1.

The v represents the atomic ratio of the element $M^1$ in all transition metals of the lithium composite transition metal oxide, wherein 0≤v<0.2, preferably 0≤v≤0.15.

Meanwhile, the lithium composite transition metal oxide constituting small-diameter particles of the present invention may have the atomic ratio of cobalt to aluminum, that is z/w, of 1.5 to 5, preferably 1.7 to 5, more preferably 1.7 to 3.

More specifically, the small-diameter particles may be a lithium composite transition metal oxide represented by Formula 2 below.

$$Li_x[Ni_yCo_zAl_wMn_v]O_2 \quad [\text{Formula 2}]$$

In Formula 2 above, x, y, z, w, and v are the same as described with reference to Formula 1 above.

Meanwhile, although not necessary, the small particle diameter particles may include a rock-salt phase on a surface portion of the lithium complex transition metal oxide. In general, a lithium composite transition metal oxide represented by Formula 1 or Formula 2 above has a layered crystal structure, but may have a rock-salt phase formed on a surface portion thereof by appropriately adjusting the firing temperature and the firing time when preparing the lithium complex transition metal oxide.

For example, the lithium composite transition metal oxide having a rock-salt phase formed on the surface portion thereof may be formed by mixing a transition metal precursor including nickel, cobalt, and aluminum, having a nickel content of 80 atm % to 85 atm %, and having an atomic ratio of cobalt to aluminum of 1.5 to 5 with a lithium raw material and then firing the mixture at 800° C. to 850° C., but is not limited thereto.

At this time, it is preferable that the average thickness of the rock-salt phase is about 10-30 nm. When the rock-salt phase is too thin, the effect of suppressing side reactions is insignificant, and when the rock-salt phase is too thick, electrochemical properties may be deteriorated. Meanwhile, the average thickness of the rock salt phase may be measured using a transmission electron microscope (TEM).

Meanwhile, the small-diameter particles may have an average particle diameter ($D_{50}$) of 2-8 μm, preferably 3-8 μm. When the average particle diameter ($D_{50}$) of the small-diameter particles satisfies the above range, the particle strength is increased to suppress particle breakage during roll-pressing, and the specific surface area is reduced to effectively suppress the occurrence of a side reaction with an electrolyte.

Next, the large-diameter particles are positive electrode active material particles having a greater average particle diameter ($D_{50}$) than the small-diameter particles, and are a lithium composite transition metal oxide having a nickel content of 80 atm % or greater in all transition metals.

The large-diameter particles may be lithium composite transition metal oxide particles having an average particle diameter ($D_{50}$) of 10-20 μm, more preferably 10-18 μm.

Specifically the large-diameter particles may be a lithium composite transition metal oxide represented by Formula 3 below.

$$Li_a[Ni_bCo_cM^2_dM^3_e]O_2 \quad [\text{Formula 3}]$$

In Formula 3 above, $M^2$ is one or more selected from Mn and Al, $M^3$ is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and 0.9≤a≤1.5, 0.8≤b<1, 0<c≤0.15, 0<d<0.2, and 0≤e<0.2.

At this time, the a represents the atomic ratio of lithium in the lithium composite transition metal oxide, wherein 0.9≤a≤1.5, preferably 0.9≤a≤1.2, more preferably 0.9≤a≤1.1.

The b represents the atomic ratio of nickel in all transition metals of the lithium composite transition metal oxide, wherein 0.8≤b<1, preferably 0.8≤b≤0.90, more preferably 0.8≤y≤0.85.

The c represents the atomic ratio of cobalt in all transition metals of the lithium composite transition metal oxide, wherein 0<c≤0.15, preferably 0.01≤c≤0.15, more preferably 0.01≤c≤0.1.

The d represents the atomic ratio of the element $M^2$ in all transition metals of the lithium composite transition metal oxide, wherein 0<d<0.2, preferably 0.01≤d≤0.15.

The e represents the atomic ratio of the element $M^3$ in all transition metals of the lithium composite transition metal oxide, wherein 0≤e<0.2, preferably 0≤e≤0.15.

Meanwhile, in Formula 3 above, $M^2$ may be $Al_{d1}Mn_{d2}$, and in this case, 0.9≤a≤1.5, 0.8≤b<1, 0<c≤0.1, 0<$d_1$<0.1, 0<$d_2$<0.2, and 1.5≤c/$d_1$≤5.

In the present invention, the large-diameter particles may have the same composition as that of the small-diameter particles, or may have a different composition.

Meanwhile, the lithium composite transition metal oxide used as large-diameter particles and/or small-diameter particles in the present invention may further include a coating layer including at least one coating element selected from the group consisting of Al, Ti, W, B, F, P, Mg, Ni, Co, Fe, Cr, V, Cu, Ca, Zn, Zr, Nb, Mo, Sr, Sb, Bi, Si, and S, when necessary. When the coating layer is included as described above, the contact between the lithium composite transition metal oxide and an electrolyte is blocked, thereby suppressing the occurrence of a side reaction. Therefore, when applied to a battery, lifespan properties may be improved, and also, the filling density of the positive electrode material may be increased.

As described above, when a coating element is further included, the content of the coating element in the coating layer may be 100 ppm to 10,000 ppm, preferably 200 ppm to 5,000 ppm based on the total weight of the lithium composite transition metal oxide. For example, when a coating element is included in the above range based on the total weight of the lithium composite transition metal oxide, the occurrence of a side reaction with an electrolyte may be further effectively suppressed, and when applied to a battery, lifespan properties may be further improved.

The coating layer may be formed on the entire surface or on a portion of the surface of the lithium composite transition metal oxide. Specifically, when the coating layer is formed on a portion of the surface of the lithium composite transition metal oxide, the coating layer may be formed in an area of 5% to less than 100%, preferably 20% to less than 100% of the total surface area of the lithium composite transition metal oxide.

The positive electrode material of the present invention may include the small-diameter particles and the large-diameter particles at a weight ratio of 1:9 to 5:5, preferably 2:8 to 3:7. When the mixing ratio of the small-diameter particles and the large-diameter particles satisfies the above range, roll-pressing density is improved so that energy density is increased, and due to the buffering action of the small-diameter particles, the large-diameter particles are prevented from being broken during roll-pressing an electrode, so that it is advantageous in terms of lifespan properties.

<Positive Electrode and Secondary Battery>

The above-described positive electrode material according to the present invention may be usefully used in manufacturing a lithium secondary battery.

Specifically, a positive electrode according to the present invention includes the positive electrode material according to the present invention. More specifically, the positive electrode includes a positive electrode current collector and a positive electrode active material layer formed on the positive electrode current collector. At this time, the positive electrode active material layer may include the positive electrode material according to the present invention. The detailed description of the positive electrode material according to the present invention is the same as described above, and thus, a detailed description thereof will be omitted.

The positive electrode may be manufactured according to a typical method for manufacturing a positive electrode except that the positive electrode material according to the present invention is used as a positive electrode active material. For example, the positive electrode may be manufactured by manufacturing a positive electrode mixture by dissolving or dispersing components constituting a positive electrode active material layer, which are a positive electrode material, a conductive material and/or a binder, and the like in a solvent, applying the mixture on at least one surface of a positive electrode current collector, followed by drying and then roll-pressing. Alternatively, the positive electrode may be manufactured by casting the positive electrode mixture on a separate support, and then laminating a film obtained by being peeled off from the support on the positive electrode current collector.

At this time, the positive electrode current collector is not particularly limited as long as it has a conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

On at least one surface of the current collector, a positive electrode active material layer including the positive electrode material according to the present invention, and further including, if necessary, at least one of a conductive material or a binder optionally is disposed.

The positive electrode material may be included in an amount of 80-99 wt %, more specifically 85-98 wt % based on the total weight of the positive electrode active material layer. When included in the above content range, excellent capacity properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on the total weight of the positive electrode active material layer.

In addition, the binder serves to improve the bonding between positive electrode active material particles and the adhesion between a positive electrode active material and a current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of the positive electrode active material layer.

Meanwhile, the solvent used in preparing the positive electrode mixture may be a solvent commonly used in the art. For example, dimethyl sulfoxide (DMSO), isopropyl alcohol, N-methylpyrrolidone (NMP), acetone, water, and the like may be used alone, or a mixture thereof may be used. The amount of the solvent to be used may be appropriately adjusted in consideration of the applying thickness, preparation yield, viscosity, and the like of a slurry.

Next, a secondary battery according to the present invention will be described.

The secondary battery according to the present invention includes a positive electrode, a negative electrode positioned to face the positive electrode, a separator interposed between the positive electrode and the negative electrode, and an electrolyte. At this time, the positive electrode is the positive electrode according to the present invention described above.

Meanwhile, the secondary battery may further include a battery case for accommodating an electrode assembly composed of the positive electrode, the negative electrode, and the separator, and a sealing member for sealing the battery case, optionally.

In the secondary battery, the negative electrode includes a negative electrode current collector and a negative electrode active material layer disposed on at least one surface of the negative electrode current collector.

The negative electrode may be manufactured according to a typical method for manufacturing a negative electrode known in the art. For example, the negative electrode may be manufactured by manufacturing a negative electrode mixture by dissolving or dispersing components constituting a negative electrode active material layer, which are a negative electrode active material, a conductive material and/or a binder, and the like in a solvent, applying the negative electrode mixture on at least one surface of a negative electrode current collector, followed by drying and then roll-pressing. Alternatively, the negative electrode may be manufactured by casting the negative electrode mixture on a separate support, and then laminating a film obtained by being peeled off from the support on the negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 µm to 500 µm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_v$ (0<v<2), $SnO_2$, a vanadium oxide, and a lithium vanadium oxide; or a composite including the metallic compound and the carbonaceous material such as a Si—C composite or a Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Also, the binder and the conductive material may be the same as those described above in the description of the positive electrode.

Meanwhile, in the secondary battery, a separator is to separate the negative electrode and the positive electrode and to provide a movement path for lithium ions. Any separator may be used without particular limitation as long as it is typically used as a separator in a secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used. Furthermore, a coated separator including a ceramic component or a polymer material may be used to secure heat resistance or mechanical strength, and may be used in a single-layered or a multi-layered structure, selectively.

Meanwhile, the electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used.

Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable.

Any lithium salt may be used without particular limitation as long as it is typically used in an electrolyte for a lithium secondary battery. For example, the lithium salt may include $Li^+$ as positive ions, and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as negative ions. Specifically, the lithium salt may include a single material selected from the group consisting of LiCl, LiBr, LiI, $LiClO_4$, $LiBF_4$, LiBioClio, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof.

The content of the lithium salt may be appropriately changed within a typical range in which a lithium salt may be used. Specifically, the lithium salt may be included in an electrolyte in a range of 0.8 M to 3 M, specifically 0.1 M to 2.5 M.

In the electrolyte, in order to improve the lifespan properties of a battery, suppress the reduction in battery capacity, and improve the discharge capacity of the battery, and the like, various additives may be used in addition to the above electrolyte components. As the additives, for example, a halo-alkylene carbonate-based compound such as difluoroethylene carbonate; or pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be included, and the above additives may be used alone or in combination. At this time, the additive may be included in an amount of 0.1 wt % to 5 wt % based on the total weight of the electrolyte.

The above lithium secondary battery according to the present invention may be usefully used in portable devices such as a mobile phone, a notebook computer, and a digital camera, and in electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

MODE FOR CARRYING OUT THE INVENTION

Hereinafter, the present invention will be described in more detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

Example 1

$LiNi_{0.81}Co_{0.05}Mn_{0.12}Al_{0.02}O_2$ having an average particle diameter ($D_{50}$) of 5 μm and $LiNi_{0.83}Co_{0.08}Mn_{0.07}Al_{0.02}O_2$ having an average particle diameter ($D_{50}$) of 15 μm were mixed at a weight ratio of 2:8 to prepare Positive electrode material A.

Example 2

$LiNi_{0.81}Co_{0.08}Mn_{0.09}Al_{0.02}O_2$ having an average particle diameter ($D_{50}$) of 5 μm and $LiNi_{0.83}Co_{0.08}Mn_{0.07}Al_{0.02}O_2$ having an average particle diameter ($D_{50}$) of 15 μm were mixed at a weight ratio of 2:8 to prepare Positive electrode material B.

Example 3

$LiNi_{0.81}Co_{0.05}Mn_{0.11}Al_{0.03}O_2$ having an average particle diameter ($D_{50}$) of 5 μm and $LiNi_{0.83}Co_{0.08}Mn_{0.07}Al_{0.02}O_2$ having an average particle diameter ($D_{50}$) of 15 μm were mixed at a weight ratio of 2:8 to prepare Positive electrode material C.

Comparative Example 1

$LiNi_{0.83}Co_{0.11}Mn_{0.6}O_2$ having an average particle diameter ($D_{50}$) of 5 μm and $LiNi_{0.83}Co_{0.08}Mn_{0.07}Al_{0.02}O_2$ having an average particle diameter ($D_{50}$) of 15 μm were mixed at a weight ratio of 2:8 to prepare Positive electrode material D.

Comparative Example 2

$LiNi_{0.83}Co_{0.05}Mn_{0.08}Al_{0.04}O_2$ having an average particle diameter ($D_{50}$) of 5 μm and $LiNi_{0.83}Co_{0.08}Mn_{0.07}Al_{0.02}O_2$ having an average particle diameter ($D_{50}$) of 15 μm were mixed at a weight ratio of 2:8 to prepare Positive electrode material E.

Comparative Example 3

$LiNi_{0.82}Co_{0.11}Mn_{0.06}Al_{0.01}O_2$ having an average particle diameter ($D_{50}$) of 5 μm and $LiNi_{0.83}Co_{0.08}Mn_{0.07}Al_{0.02}O_2$ having an average particle diameter ($D_{50}$) of 15 μm were mixed at a weight ratio of 2:8 to prepare Positive electrode material F.

Comparative Example 4

$LiNi_{0.70}Co_{0.15}Mn_{0.10}Al_{0.05}O_2$ having an average particle diameter ($D_{50}$) of 5 μm and $LiNi_{0.83}Co_{0.08}Mn_{0.07}Al_{0.02}O_2$ having an average particle diameter ($D_{50}$) of 15 μm were mixed at a weight ratio of 2:8 to prepare Positive electrode material G.

Comparative Example 5

$LiNi_{0.86}Co_{0.10}Mn_{0.02}Al_{0.02}O_2$ having an average particle diameter ($D_{50}$) of 5 μm and $LiNi_{0.83}Co_{0.08}Mn_{0.07}Al_{0.02}O_2$ having an average particle diameter ($D_{50}$) of 15 μm were mixed at a weight ratio of 2:8 to prepare Positive electrode material H.

<Manufacturing Coin Half-Cell>

The positive electrode material produced in each of Examples 1 to 3 and Comparative Examples 1 to 5, a carbon black conductive material, and a PVdF binder were mixed in an N-methylpyrrolidone solvent at a weight ratio of 96.5:1.5:2.0 to prepare a positive electrode mixture material, and the positive electrode mixture material was applied on one surface of an aluminum current collector, dried at 130° C., and then roll-pressed to manufacture a positive electrode.

Lithium metal was used as a negative electrode.

A porous polyethylene separator was interposed between the positive electrode and the negative electrode which were manufactured as described above to prepare an electrode assembly, and then the electrode assembly was placed inside a case. Thereafter, an electrolyte was injected into the case to manufacture a coin half-cell.

At this time, the electrolyte was prepared by dissolving lithium hexafluorophosphate ($LiPF_6$) of 1.0 M concentration in an organic solvent composed of ethylene carbonate/dimethyl carbonate/ethylmethyl carbonate (mixing volume ratio of EC/DMC/EMC=3/4/3).

Experimental Example 1: DSC Evaluation

Coin half-cells each manufactured by using the positive electrode material of each of Examples 1 to 3 and Comparative Examples 1 to 5 were charged to 4.25 V by being applied with a current of 0.2 C, followed by being discharged to 2.5 V, and then were charged again to 4.25 V with a current of 0.2 C. Then, the fully charged coin cell was decomposed to recover the positive electrode, and the recovered positive electrode was washed with dimethyl carbonate for 30 seconds to remove the electrolyte remaining on the surface of the electrode, and then dried. The dried electrode was punched to match the size of a pan of a differential scanning calorimeter (HP-DSC from Setaram Co., Ltd.), and then put into the pan with 20 μL of the same electrolyte as the electrolyte injected into the coin cell, and then the pan was sealed. Thereafter, the heating amount was measured by raising the temperature by 10° C. per minute from 25° C. to 400° C.

Figure 1:
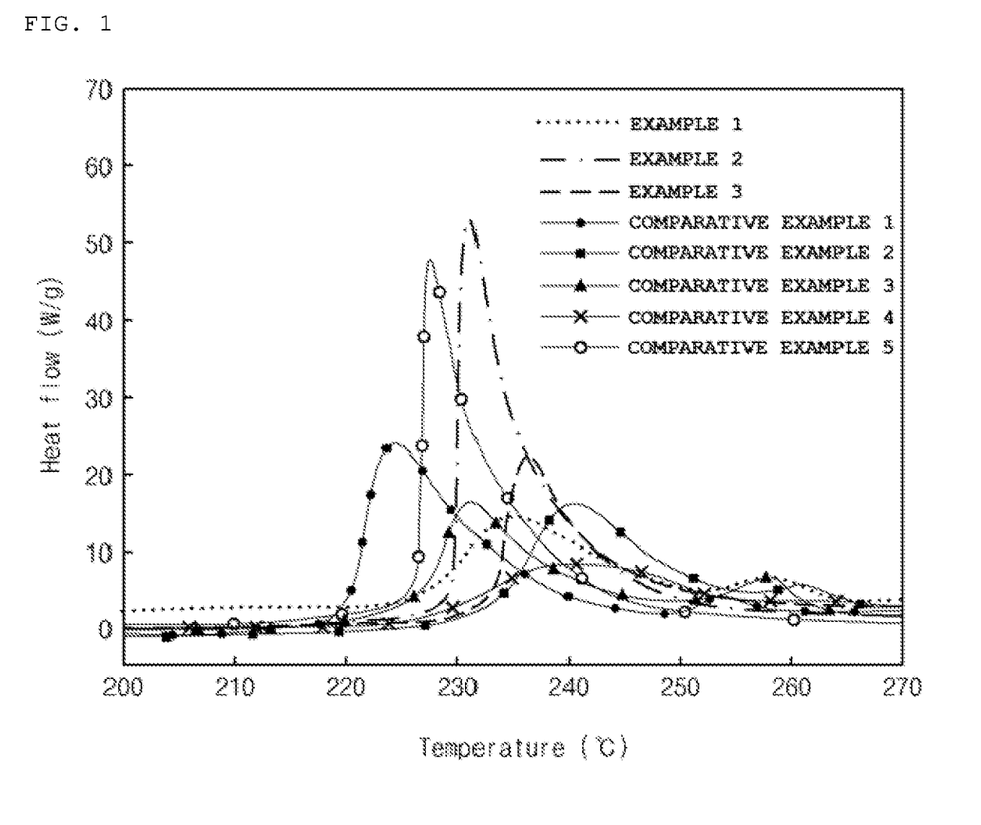
FIG. 1 is a graph showing evaluation results according to Differential Scanning Calorimetry of the positive electrode material of each of Examples 1 to 3 and Comparative Examples 1 to 5.

The measurement results are shown in FIG. 1. As shown in FIG. 1, the positive electrode material of each of Examples 1 to 3 was excellent in thermal stability by having an exothermic starting temperature of 225° C. or higher, and the positive electrode material of Example 3 had particularly excellent in thermal stability by having an exothermic starting temperature of 230° C. or higher.

As compared with the present invention, in the cases of the positive electrode material of Comparative Example 1 using small-diameter particles not including Al, the positive electrode material of Comparative Example 3 using small-diameter particles having an atomic ratio of cobalt to aluminum (Co/Al) of greater than 5, and the positive electrode material of Comparative Example 5 using small-diameter particles having a nickel content of 85 atm % or greater, the exothermic starting temperature each thereof was lower than that of the positive electrode material of each of Examples 1 to 3, indicating poorer thermal stability.

Meanwhile, the positive electrode material of each of Comparative Examples 2 and 4 had a similar level of thermal stability as the positive electrode material of Examples.

Experimental Example 2: Evaluation of Continuous Charge

Coin half-cells each manufactured using the positive electrode material of each of Examples 1 to 3 and Comparative Examples 1 to 5 were measured for the amount of current leakage during continuous charge. Specifically, the coin half-cells were charged/discharged under the conditions of 0.2 C/0.2 C at 50° C. and then charged to 4.7 V with 0.2 C in a CC-CV mode. The charge was set to be terminated after 120 hours, and thereafter, the average leak current was obtained by dividing the capacity for 120 hours by the time. The measurement results are shown in FIG. 2.

Figure 2:
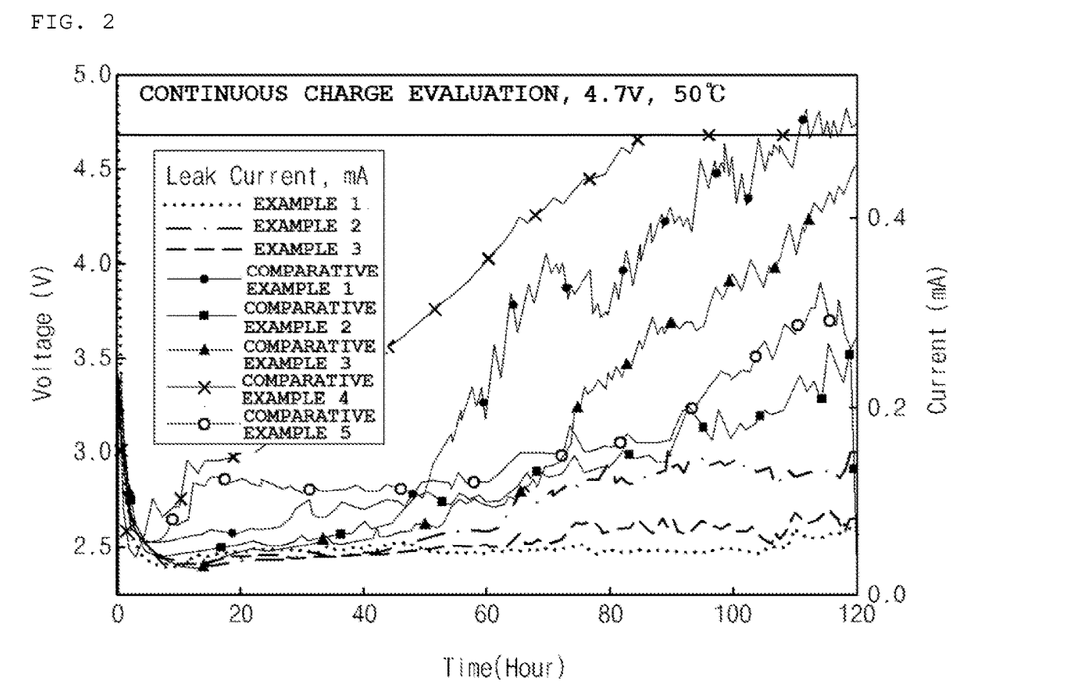
FIG. 2 is a graph showing leakage current amount evaluation results during continuous charge evaluated according to Experimental Example 2.

As shown in FIG. 2, it was confirmed that the coin half-cells each using the positive electrode material of each of Examples 1 to 3 had a less leak current amount during continuous charge than the coin half-cells each using the positive electrode material of each of Comparative Examples 1 to 5.

Experimental Example 3: High-Temperature Lifespan Properties

<Manufacturing Full-Cell>
The positive electrode material produced in each of Examples 1 to 3 and Comparative Examples 1 to 5, a carbon black conductive material, and a PVdF binder were mixed in an N-methylpyrrolidone solvent at a weight ratio of 96.5:1.5:2.0 to prepare a positive electrode mixture material, and the positive electrode mixture material was applied on one surface of an aluminum current collector, dried at 130° C., and then roll-pressed to manufacture a positive electrode.

A negative electrode active material, a binder, and a conductive material were mixed in an N-methylpyrrolidone solvent at a weight ratio of 95.6:3.4:1.0 to prepare a negative electrode mixture material. At this time, natural graphite and artificial graphite were mixed at a weight ratio of 9:1 and used as the negative electrode active material, BML302 (Zeon Co., Ltd.) was used as a binder, and Super C-65 (Timcal Co., Ltd.) was used as a conductive material. The prepared negative electrode mixture material was applied on a copper current collector, dried at 130° C., and then roll-pressed to manufacture a negative electrode.

A separator was interposed between the positive electrode and the negative electrode which were manufactured as described above, and an electrolyte was injected thereto manufacture a lithium secondary battery.

The lithium secondary battery manufactured as described above was subjected to a lifespan properties evaluation according to the following method.

The lithium secondary battery was charged to 4.2 V with 0.33 C at 45° C. and then discharged to 2.5 V with a constant current of 0.33 C for 100 times to perform 100 charge/discharge cycles. The discharge capacity retention rate was measured after the 100th cycle based on the discharge capacity after the 1st cycle. The measurement results are shown in FIG. 3.

Figure 3:
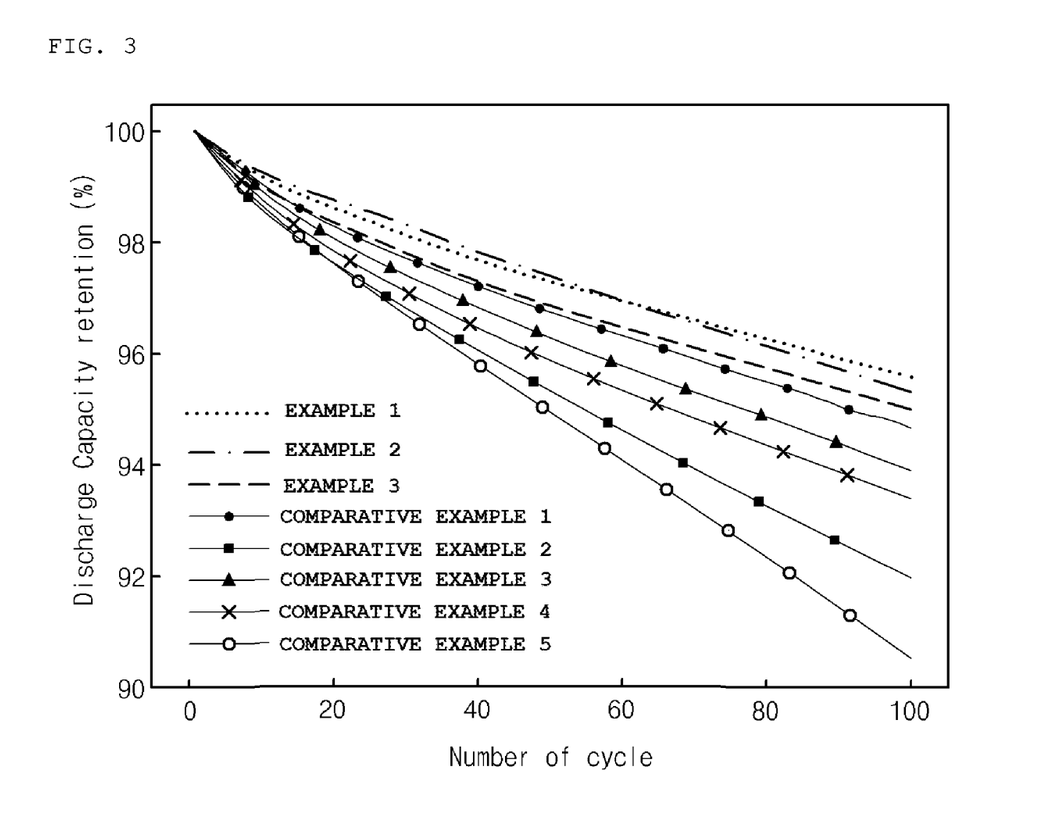
FIG. 3 is a graph showing high-temperature lifespan properties evaluated according to Experimental Example 3.

As shown in FIG. 3, it can be seen that the lifespan properties of the lithium secondary batteries each using the positive electrode material of each of Examples 1 to 3 are excellent compared with the lithium secondary batteries each using the positive electrode material of each of Comparative Examples 1 to 5.

The invention claimed is:

1. A positive electrode material having a bimodal particle size distribution, comprising large-diameter particles and small-diameter particles having different average particle diameters ($D_{50}$),
   wherein the large-diameter particles are a lithium composite transition metal oxide having a nickel content of 80 atm % or greater in all transition metals, and
   the small-diameter particles are a lithium composite transition metal oxide including nickel, cobalt, and aluminum, having a nickel content of 80 atm % to 85 atm % in all transition metals, and having an atomic ratio of the cobalt to the aluminum (Co/Al) of 1.5 to 5,
   wherein the small-diameter particles comprise a lithium composite transition metal oxide represented by Formula 1 below, and
   wherein the large-diameter particles comprise a lithium composite transition metal oxide represented by Formula 3 below:

$$Li_x[Ni_yCo_zAl_wM^1_v]O_2 \qquad \text{[Formula 1]}$$

wherein,
$M^1$ is one or more selected from the group consisting of Mn, W, Cu, Fe, Ba, V, Cr, Ti, Zr, Zn, In, Ta, Y, La, Sr, Ga, Sc, Gd, Sm, Ca, Ce, Nb, Mg, B, and Mo, and
$0.9 \le x \le 1.5$, $0.8 \le y \le 0.85$, $0 < z \le 0.1$, $0 < w \le 0.1$, $1.5 \le z/w \le 5$, and $0 \le v < 0.2$, $$Li_a[Ni_bCo_cM^2_dM^3_e]O_2 \qquad \text{[Formula 3]}$$

wherein, $M^2$ is $Al_{d1}Mn_{d2}$, $M^3$ is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and $0.9 \leq a \leq 1.5$, $0.8 \leq b < 1$, $0 < c \leq 0.15$, $0 < d < 0.2$, $0 < d_1 \leq 0.1$, $0 < d_2 < 0.2$, and $0 \leq e < 0.2$.

2. The positive electrode material of claim 1, wherein the small-diameter particles are a lithium composite transition metal oxide represented by Formula 2 below:

$$Li_x[Ni_yCo_zAl_wMn_v]O_2 \quad \text{[Formula 2]}$$

wherein, $0.9 \leq x \leq 1.5$, $0.8 \leq y \leq 0.85$, $0 < z \leq 0.1$, $0 < w \leq 0.1$, $1.5 \leq z/w \leq 5$, and $0 \leq v < 0.2$.

3. The positive electrode material of claim 1, wherein in the Formula 3, $1.5 \leq c/d_1 \leq 5$.

4. The positive electrode material of claim 1, wherein the average particle diameter ($D_{50}$) of the small-diameter particles is from 2 to 8 μm.

5. The positive electrode material of claim 1, wherein the average particle diameter ($D_{50}$) of the large-diameter particles is from 10 to 20 μm.

6. The positive electrode material of claim 1, wherein the small-diameter particles and the large-diameter particles are included in a weight ratio of 1:9 to 5:5.

7. A positive electrode comprising:
a positive electrode current collector; and
a positive electrode active material layer formed on the positive electrode current collector,
wherein the positive electrode active material layer comprises the positive electrode material of claim 1.

8. A lithium secondary battery comprising:
the positive electrode of claim 7;
a negative electrode;
a separator interposed between the positive electrode and the negative electrode; and
an electrolyte.

9. A positive electrode material having a bimodal particle size distribution, comprising large-diameter particles and small-diameter particles having different average particle diameters ($D_{50}$),
wherein the large-diameter particles are a lithium composite transition metal oxide having a nickel content of 80 atm % or greater in all transition metals, and
the small-diameter particles are a lithium composite transition metal oxide including nickel, cobalt, and aluminum, having a nickel content of 80 atm % to 85 atm % in all transition metals, and having an atomic ratio of the cobalt to the aluminum (Co/Al) of 1.5 to 5,
wherein the small-diameter particles comprise a lithium composite transition metal oxide represented by Formula 2 below, and
wherein the large-diameter particles comprise a lithium composite transition metal oxide represented by Formula 3 below:

$$Li_x[Ni_yCo_zAl_wMn_v]O_2 \quad \text{[Formula 2]}$$

wherein, $0.9 \leq x \leq 1.5$, $0.8 \leq y \leq 0.85$, $0 < z \leq 0.1$, $0 < w \leq 0.1$, $1.5 \leq z/w \leq 5$, and $0 \leq v < 0.2$, $$Li_a[Ni_bCo_cM^2_dM^3_e]O_2 \quad \text{[Formula 3]}$$

wherein, $M^2$ is $Al_{d1}Mn_{d2}$, $M^3$ is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and $0.9 \leq a \leq 1.5$, $0.8 \leq b < 1$, $0 < c \leq 0.15$, $0 < d < 0.2$, $0 < d_1 \leq 0.1$, $0 < d_2 < 0.2$, and $0 \leq e < 0.2$.

* * * * *